Patented Jan. 17, 1950

2,495,097

UNITED STATES PATENT OFFICE 2,495,097

METHOD OF MAKING SPONGE RUBBER FROM A MIXTURE OF POLYCHLOROPRENE AND NATURAL RUBBER

Harold W. Greenup, Barrington, and Wilbur F. Jordan, Tiverton, R. I., assignors to The Firestone Tire & Rubber Company, Akron, Ohio, a corporation of Ohio No Drawing. Application January 12, 1946, Serial No. 641,006

4 Claims. (Cl. 260—2.5)

This invention relates to molded sponge produced by curing a foamed latex composed essentially of a polymerized chloroprene. Such sponge rubber is preferred to other rubbers for many purposes because of its resistance to combustion. A small amount of other latex, such as natural rubber latex, may be mixed with the latex of polymerized chloroprene to reduce the raw material cost; but, in general, the rubber content of a flame-resistant sponge will be composed of at least 90 per cent polymerized chloroprene. The invention includes both the product and the method of producing it.

The commercial polymerized chloroprenes are made by E. I. du Pont de Nemours and Company, of Wilmington, Delaware, and are sold under the generic name of neoprenes. They will be referred to by this name in this specification.

The molded sponge products of this invention are free from the defects produced by gel shrinkage which has accompanied all prior processes of curing neoprene. Gel shrinkage is that shrinkage of the foamed latex which occurs during setting of the foam or during curing when the latex has not been allowed to set before the cure is commenced. Such shrinkage is not to be confused with the shrinkage normal to all commercial foamed latex sponges which occurs during the cure and on drying after the cure has been completed. The latter type of shrinkage does not produce the objectionable unevenness characteristic of molding in a partially filled mold. When the skin of the sponge adheres to the mold and the foamed latex then shrinks, the skin separates from the mold.

The invention reduces gel shrinkage to the point where the process of making neoprene sponge becomes commercial, by using a particular type of accelerator for accelerating the vulcanization of the rubber and permitting the latex to age before foaming. Both features are essential to the process of this invention. Accelerators which have been found satisfactory for such curing are aldehyde-amine condensation products; viz., Du Pont 808 (butyraldehyde-aniline), Du Pont 833 (butyraldehyde - monobutylamine), Trimene Base (triethyl-trimethylene triamine), Heptene Base (heptaldehyde-aniline), and Phenex (alpha-ethyl, beta-propyl acrolein-aniline). Other aldehyde-amines, such as acetaldehyde-aniline, formaldehyde-aniline, etc., cause gel shrinkage even though the latex is aged before curing.

The invention will be further explained in connection with the following examples. In compounding the formulae, the various dispersions used may be prepared by ball-milling suitable aqueous preparations containing usual dispersing agents, such as Darvan No. 1 (alkylnaphthalene sulfonic acid sodium salt-short alkylchain) and Daxad No. 27 (mixture of monosodium salt of polymerized arylalkyl sulfonic acids and inorganic suspending agent), etc. Similarly, emulsions referred to may be produced by treating in a colloid mill aqueous preparations containing emulsifying agents, such as potassium castor oil soaps, etc. The petrolatum emulsion contained 2.0 per cent of ammonium caseinate. Both latices of the formula of Example 1 contain 60 per cent solids as indicated by "60% T. S." Clays, etc., may be added to pigment dispersions to prevent settling during storage.

Example 1

| | Parts by weight (dry basis) |
|---|---|
| Neoprene latex (60% T. S.) | 450.0 |
| Natural rubber latex (60% T. S.) | 50.0 |
| Ammonium caseinate (10% suspension) | 1.2 |
| Butyraldehyde-aniline cond. product (50% emulsion) | 10.0 |
| Sulfur (50% dispersion) | 10.0 |
| Dibetanaphthyl-para-phenylene diamine (40% dispersion) | 5.0 |
| Zinc dibutyl dithiocarbamate (50% dispersion) | 1.0 |
| Petrolatum (50% emulsion) | 22.5 |

The zinc dibutyl dithiocarbamate of the above base formula is added as an accelerator of the vulcanization of the natural rubber. The accelerator for the neoprene was the butyraldehyde-aniline condensation product known commercially as Du Pont 808. The diamine is an antioxidant. The emulsion of Du Pont 808 (and that of other latex accelerators referred to in the following example) was prepared by vigorously mixing the following ingredients and then passing them through a tight colloid mill:

| | Per cent by weight |
|---|---|
| Accelerator | 50.0 |
| 50% linseed oil soap | 2.5 |
| 10% ammonium caseinate suspension | 25.0 |
| Water | 22.5 |

If the above base formula is used in a freshly mixed condition—i. e., without aging—the foam shrinks on gelling (or on curing if no gelling period is provided), and this gel shrinkage may amount to as much as up to 30 per cent of the original volume of foam. Such shrinkage produces the unevenness in the surface of the sponge which is characteristic of curing in a partially filled mold, and skin separation may occur. Such gel shrinkage is substantially reduced by use of the butyraldehyde-aniline condensation product if the latex compounded according to the base formula is allowed to age for about 24 hours at around 80° F. before gelling. The preferred aging temperature is in the range of about 80 to 100° F., although the aging may take place at as low as 50° F. or as high as 200° F., lower or higher. The reactions which occur during aging are of a chemical nature and will take longer or shorter times, depending upon the temperature of aging.

After aging, the following mix is prepared from the aged mixture:

| | Parts by weight (wet basis) |
|---|---|
| Base formula | 91.12 |
| 35% castor oil soap emulsion | 1.92 |
| Zinc oxide (40% dispersion) | 3.37 |

The resulting latex is whipped until the desired increase in volume is obtained. Then, several per cent of a 50 per cent dispersion of sodium fluosilicate is added to gel the foam. Generally, 2 to 3 per cent will be sufficient. The foam is then immediately poured into a mold and allowed to gel at room temperature or higher. The resulting gel (produced from aged base) may be cured in water, steam or air without more shrinkage than can be tolerated commercially.

The above base formula was varied by reducing the neoprene to 400 parts, increasing the natural rubber latex to 100 parts and adjusting the accelerators accordingly. Gel shrinkage which occurred with this formula according to normal procedure was, likewise, reduced to the amount permissible in commercial operations, by aging the formula 24 hours at 80° F. before foaming.

*Example 2*

The following base formula contains no rubber-like material other than neoprene:

| | Dry basis |
|---|---|
| Neoprene latex (60% T. S.) | 500.0 |
| Ammonium caseinate (10% suspension) | 2.75 |
| Sulfur (50% dispersion) | 10.0 |
| Dibetanaphthyl-para - phenylene diamine (50% dispersion) | 5.0 |
| Petrolatum (50% emulsion) | 25.0 |
| Soft black (40% dispersion) | 5.0 |
| Butyraldehyde-aniline cond. product (50% emulsion) | 11.1 |

The various suspensions, emulsions, etc., were mixed as before, and the resulting composition was then allowed to age for 48 hours at 80° F. before foaming. On aging but 24 hours, gel shrinkage was partially overcome, but by increasing the aging period to 48 hours, it was reduced to the point where the process is capable of commercial use. A mix was then made according to the following formula:

| | Parts by weight (wet basis) |
|---|---|
| Base formula | 91.4 |
| 35% castor oil soap emulsion | 2.43 |
| Zinc oxide (40% dispersion) | 3.4 |

This mix was whipped until the desired volume increase was obtained. At this point 1.83 parts of sodium fluosilicate (50 per cent dispersion) were added and thoroughly mixed in the foam. The foam was poured into a mold and allowed to gel at room temperature for 10 minutes. The product was capable of being cured in air, steam or water without unevenness or skin separation developing.

Other molded products were produced from 100 per cent neoprene latices according to the formula of Example 2 using Trimene Base, Du Pont 833, and Phenex, each in a 50 per cent dispersion; and it was found on aging 24 hours, or in some cases longer—up to 48 hours foaming, that gel shrinkage was reduced to the point where the process was rendered capable of commercial utilization. The same treatment, using a commercial paratoluidine-formaldehyde condensation product, and a commercial acetaldehyde-aniline condensation product gave great gel shrinkage, even though the latex mixes were allowed to age before foaming.

In commercial practice it has been found desirable with those mixes which contain one of the accelerators of this invention to age the mix at an elevated temperature of about 80° F. and then to refrigerate the composition to about 50° F. until ready for use. The lower temperature eliminates or retards deterioration which occurs if the batch is maintained at the higher aging temperature, and it appears to have a favorable effect on the structure and production rate of the foam made from it.

It has been observed that the rate of foam production from a neoprene latex is several times greater than that obtained using natural rubber latex. This tends to produce a coarse foam, but this can be corrected by balancing the factors of (1) temperature of the compound, (2) addition of ammonium caseinate just prior to foaming or frothing, and (3) the amount of potassium castor oil soap used. This makes possible the production of an excellent foam at a much higher rate than has been customary with natural rubber latex.

The function of the potassium castor oil soap in the compound is several fold. It, at least to some extent, regulates the foaming rate and structure of the foam, decreases viscosity considerably, allowing the use of a higher total solids content in the compound, and acts as a stabilizer to prevent the formation of clots or local coagulation during the addition of gelling agents and pigments.

It is possible to add the zinc oxide dispersion to the mix before foaming without the serious effect on frothing usually obtained when the same procedure is carried out in connection with natural latex frothing. This simplifies the foaming operation, reduces the chance of errors by the operator, provides better distribution of the zinc oxide, and enables a more rapid turnover of material in the frothing equipment.

The gelation of the foam is produced by the dispersion of sodium fluosilicate. The required amount of this gelling agent is added to the foam when the foam volume has reached a predetermined percentage of the original volume. The subsequent addition time and mixing time bring the foam volume up to the desired final foam volume for the density desired.

Thus, it is seen that variations from the specific examples are possible within the scope of the invention which is defined in the appended claims.

What we claim is:

1. The method of producing sponge which comprises mixing with a latex the rubber-like content of which includes nothing but natural rubber and rubber-like polymerized chloroprene and is at least 90 per cent by weight polymerized chloroprene, all of the vulcanizing reagents essential to vulcanization except zinc oxide and including sulfur sufficient to vulcanize the natural rubber present and an accelerator of the class consisting of the following aldehyde-amine condensation products: butyraldehyde - aniline, butyraldehyde-monobutylamine, triethyl trimethylene triamine, heptaldehyde-aniline, and alpha-ethyl, beta-propyl acrolein-aniline; allowing the compounded latex to age at about 80° F. for 24 to 48 hours, then cooling to essentially 50° F. until ready for use and at that time adding the zinc oxide, foaming, thereafter adding a gelling agent to the foam, and thereafter curing.

2. The method of producing sponge which comprises mixing with a latex the rubber-like content of which includes nothing but natural rubber and polymerized chloroprene and is at least 90 per cent by weight polymerized chloroprene, all of the vulcanizing agents necessary to effect a cure except zinc oxide, and including sufficient sulfur to vulcanize the natural rubber present and an accelerator of the class consisting of the following aldehyde-amine condensation products: butyraldehyde - aniline, butyraldehyde - monobutylamine, triethyl trimethylene triamine, heptaldehyde-aniline, and alpha-ethyl, beta-propyl acrolein-aniline; allowing the compounded latex to age 24 hours to 48 hours at about 80° F., adding zinc oxide and foaming, then adding a gelling agent, and thereafter curing.

3. The method of producing sponge which comprises mixing with a latex the rubber-like particles of which include nothing but natural rubber and polymerized chloroprene and are at least 90 per cent by weight rubber-like polymerized chloroprene, all of the vulcanizing agents not including zinc oxide necessary to vulcanize the rubber-like particles, including sulfur sufficient to vulcanize the natural rubber present and an accelerator of the class consisting of the following aldehyde-amine condensation products: butyraldehyde - aniline, butyraldehyde - monobutylamine, triethyl trimethylene triamine, heptaldehyde-aniline, and alpha-ethyl, beta-propyl acrolein-aniline; allowing the compounded latex to age at a temperature from 50° F. to 200° F. to obtain a latex which after the addition of zinc oxide with subsequent foaming and gelling will cure without great gel shrinkage, adding zinc oxide and foaming, then adding a gelling agent and thereafter curing.

4. In the method of producing sponge from latex in which prior to foaming the latex is compounded with vulcanizing agents including zinc oxide, sufficient sulfur to vulcanize the natural rubber which is present, an accelerator of the class consisting of butyraldehyde-aniline, butyraldehyde-monobutylamine, triethyl trimethylene triamine, heptaldehyde-aniline, and alpha-ethyl, beta-propyl acrolein-aniline, the improvement which comprises using a latex the rubber content of which includes nothing but natural rubber and polymerized chloroprene and is at least 90 per cent polymerized chloroprene, compounding the accelerator and all other vulcanizing agents except the zinc oxide with the latex and allowing the mix to age for a time and at a temperature equivalent to 24 to 48 hours at 80 to 100° F., thereafter adding zinc oxide and foaming, then adding a gelling agent to the foam, and thereafter curing.

HAROLD W. GREENUP.
WILBUR F. JORDAN.

REFERENCES CITED

The following references are of record in the file of this patent:

UNITED STATES PATENTS

| Number | Name | Date |
|---|---|---|
| 2,117,591 | Alexander | May 17, 1938 |
| 2,246,315 | Murray | June 17, 1941 |
| 2,323,119 | Clayton | June 29, 1943 |
| 2,342,526 | Borton | Feb. 22, 1944 |

OTHER REFERENCES

Journal, American Chemical Society, Nov. 1931, p. 4218.

Du Pont Rubber Chemicals, Report No. 43-1, pages 17-18, Feb. 1943.

Du Pont de Nemours Informal Reports on Neoprene: BL-171, page 2, Aug. 31, 1944 and BL-181, page 3, Sept. 30, 1944.